United States Patent
Kaspersky et al.

(10) Patent No.: US 7,418,710 B1
(45) Date of Patent: Aug. 26, 2008

(54) PROCESSING DATA OBJECTS BASED ON OBJECT-ORIENTED COMPONENT INFRASTRUCTURE

(75) Inventors: Eugene V. Kaspersky, Moscow (RU); Andrey P. Doukhalov, Moscow (RU); Andrey V. Kryukov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 11/868,292

(22) Filed: Oct. 5, 2007

(51) Int. Cl.
G06F 9/54 (2006.01)
G06F 9/46 (2006.01)
G06F 12/16 (2006.01)

(52) U.S. Cl. .................. 719/313; 719/318; 719/332; 726/24

(58) Field of Classification Search ............. 719/313, 719/318, 328, 332; 726/24
See application file for complete search history.

(56) References Cited

U.S. PATENT DOCUMENTS

| | | | |
|---|---|---|---|
| 5,583,983 A | 12/1996 | Schmitter | |
| 5,751,914 A | 5/1998 | Coley et al. | |
| 6,363,435 B1 * | 3/2002 | Fernando et al. | 719/318 |
| 6,606,742 B1 | 8/2003 | Orton et al. | |
| 6,772,418 B1 * | 8/2004 | Morris | 719/318 |
| 6,834,301 B1 * | 12/2004 | Hanchett | 709/223 |
| 7,047,295 B1 * | 5/2006 | Hirsch | 709/224 |
| 7,150,014 B2 * | 12/2006 | Graupner et al. | 717/174 |
| 7,225,426 B2 | 5/2007 | Frank et al. | |
| 2004/0093587 A1 * | 5/2004 | Sesma | 717/118 |
| 2004/0237090 A1 * | 11/2004 | Pfeifer | 719/310 |
| 2005/0216564 A1 | 9/2005 | Myers et al. | |
| 2006/0144010 A1 * | 7/2006 | Wolf | 52/750 |
| 2007/0027749 A1 | 2/2007 | Peiro | |

* cited by examiner

*Primary Examiner*—Li B Zhen
(74) *Attorney, Agent, or Firm*—Bardmesser Law Group

(57) ABSTRACT

A method, system and computer program product for implementing a high level object-oriented component infrastructure is directed to providing efficient development of programmable applications and systems. Objects of a system form an object hierarchy including child-objects and parent-objects. The system components include metadata describing properties of objects that are encapsulated into each of the components. A programmable object-oriented system locates the components placed in one or several catalogs and reads the metadata. This metadata is then used by the system for determining which module needs to be loaded for creation of an instance of an object in order to support functionality requested by another system object or by an external application.

16 Claims, 9 Drawing Sheets

---

| | |
|---|---|
| *Object creation/destruction methods* | 501 |

ObjectCreate (IFACE_ID, IMPL_ID) : HANDLE
ObjectCreateDone ()
ObjectCreateQuick (IFACE_ID, IMPL_ID) : HANDLE
ObjectClose (HANDLE)

| | |
|---|---|
| *Object hierarchy navigation methods* | 502 |

ParentGet () : HANDLE
ChildGetFirst (CHILD_ENUM_CONTEXT) : HANDLE
ChildGetNext (CHILD_ENUM_CONTEXT) : HANDLE

| | |
|---|---|
| *Object property management methods* | 503 |

PropertyIsPresent (PROPID) : BOOL
PropertyGet (PROPID) : VALUE
PropertySet (PROPID)
PropertyDelete (PROPID)
PropertyNext (PROPID) : PROPID

| | |
|---|---|
| *Memory management methods* | 504 |

SetObjectHeap (HEAP)
HeapAlloc (SIZE) : PTR
HeapRealloc (PTR, SIZE) : PTR
HeapFree (PTR)

| | |
|---|---|
| *Message sending/receiving methods* | 505 |

SendMsg (MSG_CLASS, MSG_ID, MSG_DATA) : STATUS
BroadcastMsg (IFACE_ID, MSG_CLASS,
    MSG_ID, MSG_DATA) : STATUS
RegisterMsgHandler (MSG_CLASS,
    MODE, RECV_OBJECT)
UnregisterMsgHandler (MSG_CLASS, RECV_OBJECT)

201 OBJECT INTERFACE

202

Methods method_1 ()
method_2 ()
...
method_N ()

203

Attributes attribute_1
attribute_2
...
attribute_M

FIG. 2

| |
|---|
| *Object creation/destruction methods*       501 <br><br> ObjectCreate (IFACE_ID, IMPL_ID) : HANDLE <br> ObjectCreateDone () <br> ObjectCreateQuick (IFACE_ID, IMPL_ID) : HANDLE <br> ObjectClose (HANDLE) |
| *Object hierarchy navigation methods*       502 <br><br> ParentGet () : HANDLE <br> ChildGetFirst (CHILD_ENUM_CONTEXT) : HANDLE <br> ChildGetNext (CHILD_ENUM_CONTEXT) : HANDLE |
| *Object property management methods*       503 <br><br> PropertyIsPresent (PROPID) : BOOL <br> PropertyGet (PROPID) : VALUE <br> PropertySet (PROPID) <br> PropertyDelete (PROPID) <br> PropertyNext (PROPID) : PROPID |
| *Memory management methods*       504 <br><br> SetObjectHeap (HEAP) <br> HeapAlloc (SIZE) : PTR <br> HeapRealloc (PTR, SIZE) : PTR <br> HeapFree (PTR) |
| *Message sending/receiving methods*       505 <br><br> SendMsg (MSG_CLASS, MSG_ID, MSG_DATA) : STATUS <br> BroadcastMsg (IFACE_ID, MSG_CLASS, <br>     MSG_ID, MSG_DATA) : STATUS <br> RegisterMsgHandler (MSG_CLASS, <br>     MODE, RECV_OBJECT) <br> UnregisterMsgHandler (MSG_CLASS, RECV_OBJECT) |

FIG. 5

Object creation support methods  601

OnObjectInit () : STATUS
OnObjectInitDone () : STATUS

Object destruction support methods  602

OnObjectClose () : STATUS

Message handling support methods  603

MsgReceive (MSG_CLASS, MSG_ID, HDL_SENDER, MSG_DATA) : STATUS

FIG. 6

PROCESSING DATA OBJECTS BASED ON OBJECT-ORIENTED COMPONENT INFRASTRUCTURE

BACKGROUND OF THE INVENTION

1. Field of the Invention

The present invention relates to object-oriented programmable components, and more particularly, to a method and system for processing data objects based on a high level object-oriented component infrastructure directed to providing efficient development of software applications and systems.

2. Description of the Related Art

Modern techniques for developing software applications are based on an object-oriented programming paradigm. In this paradigm, functionality of a programmable system is implemented as an interaction between programmable objects. The programmable object, according to the object-oriented paradigm, includes data structures and a set of procedures that retrieve data from the data structures and change contents of the data structures in accordance with particular rules. These procedures are called "methods," and a plurality of methods, associated with an object, is referred to as an object interface.

Generally, objects within a programmable system belong to a particular common type and the objects of the same type have the same interface (i.e., a set of methods). The types of objects are referred to as classes. Object-oriented applications are typically developed using object-oriented programming languages, such as, for example C++, JAVA and C#. The object-oriented programming languages include structures for developing object-oriented executable code and can support classes and interfaces at the code level.

Typically, modern programmable systems rely on a component infrastructure. The component infrastructure provides a number of functional components (i.e., modules). Use of modules makes a system more efficient. For example, only modules whose functionality is needed for a particular application can be loaded. Several applications can use the same modules and, thereby, save memory space. The system is more flexible from a development point of view, since modules can be simply added (or replaced) to an existing system without changing an already implemented system.

In conventional implementations, division of a program code into modules is not implemented directly by means of programming language, whereas some of the older programming languages, such as, for example, Turbo Pascal have means for creating separate programmable modules. In more commonly used modern languages, such as C++ and C#, modular organization is implemented by a component infrastructure. The main task accomplished by the component infrastructure is to provide a mechanism for developing applications not in a form of a monolithic executable file, but as a set of modules that are developed and supported separately.

An example of a general-purpose component infrastructure is Microsoft Common Object Model (COM). This infrastructure defines common rules of software coding that can be used for a wide spectrum of applications. However, while being a general-purpose infrastructure, COM provides a very limited set of services performed by objects, and the services available are very low-level. A basic COM object can only support methods for increasing or decreasing a reference counter and for determining which interfaces are supported by the object. The high-level functionality (i.e., managing messages, object properties and logical connections between objects) has to be implemented by an application developer.

Therefore, when developing applications based on general purpose object-oriented infrastructures, such as COM, the high-level service interfaces for objects have to be created for each particular application. A set of the service interfaces depends on architecture of a particular application and on the tasks it accomplishes. Typically applications directed to a particular class of tasks, for example, to anti-virus processing, require similar sets of services implemented by a component infrastructure. The object infrastructure of a higher level that can provide a means for implementing typical functional elements (i.e., patterns) is generally needed for improving efficiency of application development.

A typical problem that needs to be solved when developing applications is controlling resource allocation and, in particular, controlling life-time of created objects. A reliable object infrastructure has to have a mechanism for preventing resource leaks, including leaks within programmable objects. Typically these means are implemented by various garbage collection mechanisms (for example, in COM, reference counters are used). However, in programmable applications it is often necessary to limit maximum amount of resources allocated for processing an individual request. Conventional general-purpose object-oriented infrastructures do not provide any means for accomplishing this task.

Another typical task is an inter-object transfer of information about events invoked during data processing. One of the important requirements for the information transfer between objects is an isolation of sender-objects from receiver-objects, so that a set of the receiver objects can be changed without any changes in the code of the sender-objects. An isolation of the receiver objects from the sender objects must also be ensured, so that the receiver object can receive messages of a particular type without knowing which object was the sender of the message. Conventional general purpose object-oriented infrastructures, such as COM, do not have a built-in mechanism for support of inter-object message transfer satisfying the isolation requirements. (Built-in support for isolation of senders and receivers is only provided in COM+ infrastructure).

Yet another task that needs to be solved when creating modular object-oriented applications, is cross-platform portability, so that the application can be easily transferred to a different operating system. It is highly desirable for an object-oriented infrastructure to provide an isolation of application objects from low-level application programming interfaces (APIs) of the operating system. Ideally, an object-oriented infrastructure can fully isolate components implementing the application logic from a platform-dependent program interface, so that platform-independent components can be created.

U.S. Pat. No. 6,606,742 describes an object-oriented interface that provides applications with access to functionality of the operating system. The system described herein includes a loader that dynamically loads needed fragments of executable code providing required functionality of the operating system.

U.S. Pat. No. 5,583,983 describes a system for developing object-oriented applications. The system implements a program code structure in the form of archive that contains definitions of programmable objects. The structures saved in the archive can be de-archived for implementation on different operating platforms. The system creates copies of platform-independent object implementations.

U.S. Pat. No. 7,225,426 describes a system that implements tree object structure. Each object has a number of slots containing values of properties of the object. Property slots can be defined when the object is created or they can be dynamically added in run time.

The references discussed above address only a few of particular aspects of developing applications based on object-oriented infrastructure. However, efficient development of programmable applications requires a comprehensive approach to solving the typical tasks discussed earlier. Therefore, there is a need in the art for a high level object-oriented component infrastructure directed to solving typical common tasks with regards to development of software applications and systems.

SUMMARY OF THE INVENTION

Accordingly, the present invention is directed to object-oriented programmable components, and more particularly, to a method and system for implementing a high level object-oriented component infrastructure directed to providing efficient development of programmable applications and systems, that substantially obviates one or more of the disadvantages of the related art.

According to one embodiment, a system, method and computer program product for processing data objects are provided. In one embodiment, a programmable application implements an anti-virus processing of data objects. Special system components check data objects' content for signatures of computer viruses. Other components are responsible for functionality directed to unpacking of archives and packed objects. And yet other system components implement various service functions.

In another embodiment, system components include metadata describing properties of objects that are encapsulated into each of the components. A programmable object-oriented system locates the components placed in one or several catalogs and reads the metadata. This metadata is then used by the system for determining which module needs to be loaded for creation of an instance of an object in order to support functionality requested by another system object or by an external application.

In another embodiment, a programmable object-oriented system has a capability for dynamically changing a set of components by loading the components in the process of regular update of anti-virus databases. The same instances of platform-independent components can be used by applications run on different operating systems implemented on compatible platforms.

In an exemplary embodiment, a special high level description language for creating object interfaces is used. Initial files are processed by a compiler of this language for creating files that can be processes by common high level language, such as for example C, C++, C#, JAVA, etc. These files provide formal description for implementation of the object interfaces using common languages. They also integrate the object interfaces into modules and implement system requirements with respect to registration and functioning of the modules.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings:

FIG. 2 illustrates a structure of an exemplary object interface, in accordance with an exemplary embodiment;

FIG. 5 illustrates a structure of a system interface of an object, in accordance with an exemplary embodiment;

FIG. 6 illustrates a structure of an internal interface of an object, in accordance with an exemplary embodiment;

DETAILED DESCRIPTION OF THE PREFERRED EMBODIMENTS

Figure 1:
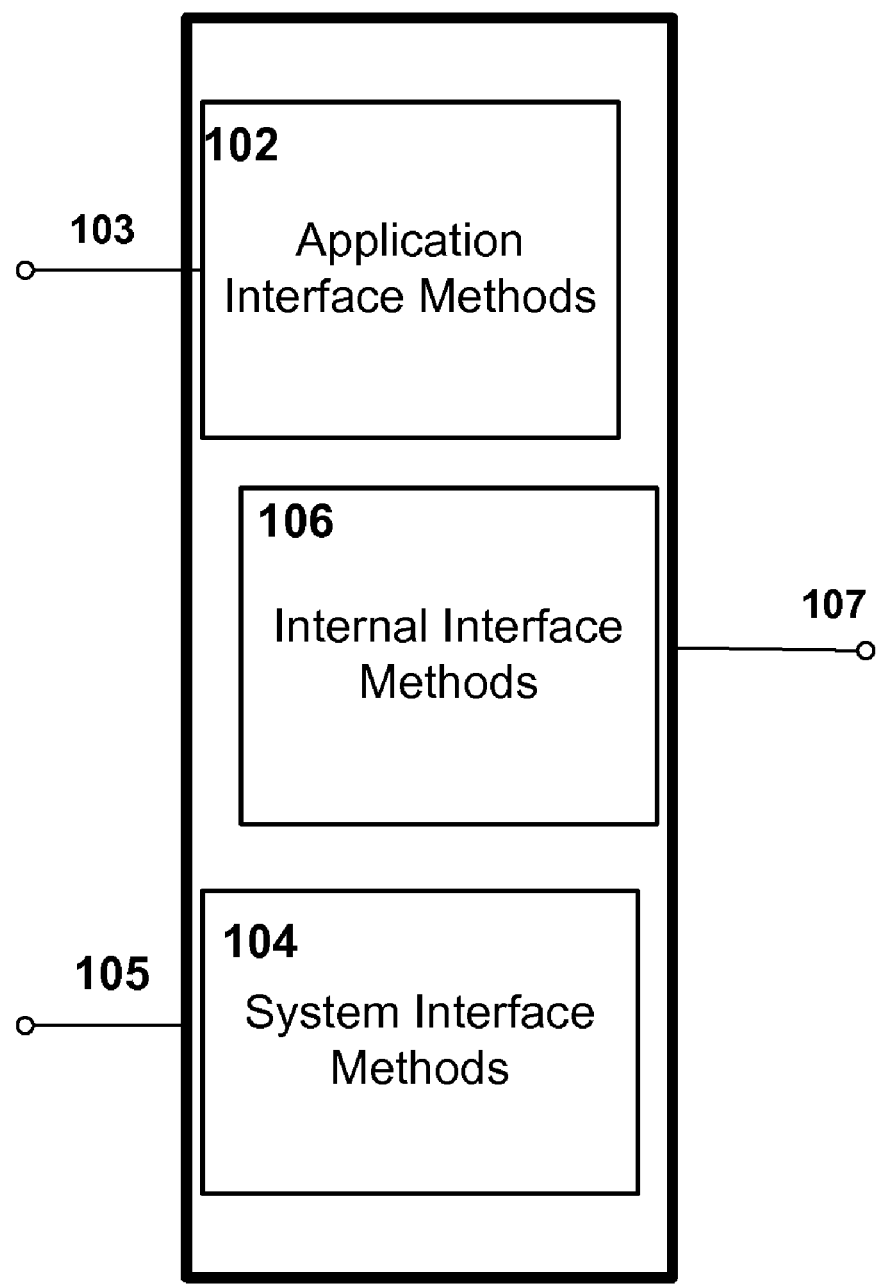
FIG. 1 illustrates an object structure, in accordance with an exemplary embodiment.

Reference will now be made in detail to the preferred embodiments of the present invention, examples of which are illustrated in the accompanying drawings.

The following definitions will be used throughout the discussion below:

A programmable object includes data structures and a set of procedures that retrieve data from the data structures and change content of the data structures in accordance with a particular set of rules. These procedures are called methods and a plurality of methods, associated with an object, create an object interface. In the described embodiment, some methods of the object interface have the semantics of receiving and setting values for certain attributes (properties), associated with the object. Such attributes are considered part of the object interface and are called "object properties". An object property is a named attribute of an object that has specific methods of receiving and setting its value. The objects belong to one of the common types. The objects of the same type have the same interface (i.e., set of methods and properties) and are referred to as class.

One of ordinary skill in the art would appreciate that the examples given herein are not exhaustive, and many other embodiments and examples of software components and objects that can be implemented in a manner described herein can be contemplated in the context of an object-oriented infrastructure.

A data processing system, according to an exemplary embodiment, includes:

means for supporting a hierarchy of objects being processed;

means for supporting storage of sets of object properties;

means for sending and receiving messages by objects;

means for supporting loading of programmable components, some of which are implemented in an operating system-independent manner.

In an exemplary embodiment, each object supports a programmable interface implemented as a set of methods and properties. Each object contains a set of typical properties that can be changed during system execution. Each object has a general-purpose system interface, that includes the following exemplary methods:

allocation and freeing up memory;
creation and deletion of child objects;
controlling sets of properties and their values;
navigation through an object hierarchy;
sending messages through the hierarchical object structure; and
registering subscriptions for messages.

The system implementation, according to the preferred embodiment, is based on the following approach. A programmable system is divided into modules. Each module contains code that implements functionality of the methods of one or several classes of objects. The system includes a loader module that performs loading of modules needed for implementation of functionality requested by other modules.

Programmable objects of the proposed infrastructure form a hierarchy. Each object (except for the root object) has a parent object and a number of child objects. The hierarchy is used for controlling object's life span (i.e., when an object is destroyed, all of the child objects are automatically destroyed as well). The hierarchy is also used for implementation of mechanism of sending messages from/to child-objects and from/to parent-objects.

Each object implemented by the programmable system has an application interface defined by a class the object belongs to. In addition to the application interface, all objects have a system interface that is common for all of the objects in the system. The system interface includes the following exemplary methods for:

allocation and freeing up memory;
creation and deletion of child-objects;
setting properties and receiving values of the properties; and
sending and receiving messages.

Modules of the programmable system can be of two types—system-dependent and system-independent. The system-dependent modules are the ones that directly use the functionality of an operating system. The system-independent modules use only the functionality of other modules (system-dependent or system-independent). The system-independent modules can be presented in a format that allows using the modules on any operating system run on a compatible platform as, for example, Microsoft Windows, Linux or Mac OS/X run on any processor with x86 architecture.

Object interfaces and their metadata parameters (including class identifiers) are preferably described using a specialized interface description language. Such interface descriptions are then processed by an interface definition compiler. The interface definition compiler produces a set of files in the target language (for example, C++), containing template code of an object implementing the given interface.

An exemplary object's structure is shown in FIG. 1. The object 101 includes an application interface 103, an internal interface 107 and a system interface 105. The application interface 103 is implemented using methods 102. Functionality of code and data used for implementation of the application interface 103 is defined by a developer of a particular module. As a rule the application interface 103 is intended for a class of objects. Each object of a programmable system includes a standard system interface 105 that is supported by all of the objects of a particular system.

The system interface is implemented using system interface methods 104. Each object also supports a set of internal methods 106 that create the internal interface 107. The internal methods 106 are service methods invoked by the system. Examples of the internal methods are a response to creation or termination of an object, or a response to receipt of messages sent by other objects. The responses of an object to different events are determined by a developer of a particular module and can be different for different classes of objects.

Implementation of methods 106 of the internal interface 107 is determined by the developer of a programmable module. However, unlike the methods 102 of the application interface 103, not all the methods have to be implemented by the module developer, since the system calls methods 106 only if they are implemented for notifications about system events. A custom implementation of the methods 106 of the internal interface 107 is only needed when the developer needs to add some response about events that take place in the system, e.g., creating and destroying objects, receiving messages, etc.

FIG. 2 illustrates an exemplary structure of an object interface. An object interface 201 (either an application interface or an internal interface) includes a set of methods 202 and a set of properties 203. The methods 202 are referenced by numbers in a method table. A number of methods 202 and content and types of arguments of a particular method are fixed for each object interface 201. The properties 203 are identified by numeric IDs and access to their values for reading and writing is implemented by methods 104 of the system interface 105 (see FIG. 1), such as, for example methods PropertyGet and PropertySet used in one of the standard implementations.

As discussed above, an object interface includes methods and properties that have to be supported by all of the implementations of this interface. The implementation of the interface, in this discussion, means a combination of code and metadata that defines the behavior of a particular object that supports a given interface. For example, an interface IO for accessing data contains methods Read and Write and has a property SIZE. Many implementations of the IO interface can exist. A FILE implementation can be used as one of the examples of a typical implementation of the IO interface. The FILE implementation provides support for operations with files over an interface of a file system. Another example is BUFFER implementation that supports operations with data stored in memory. A system can concurrently have any number of both types of objects with different implementations of the IO interface.

Despite the fact that different implementations of IO interface share the same set of methods and properties belonging to the interface, each specific implementation can extend the set of properties with its own special properties. For example, the implementation FILE for a particular instance of an object can require a file name and open mode parameters for opening the file, while the implementation BUFFER may require a pointer to object's data and its size. Therefore, each implementation has to support specific interface extensions created just for the given implementation. Such extensions are often bound to the inner functionality of specific implementation and are not sufficiently general to be added to the declaration of the "base" interface.

In a programmable system of the preferred embodiment the problem of the implementation-specific interfaces is addressed by broadening a set of properties of the base interface. Any interface implementation can extend the set of properties (i.e., add properties) of the base interface indefinitely. The properties added in a particular implementation are referred to as implementation properties as opposed to interface properties that belong to the particular base interface.

Figure 3:
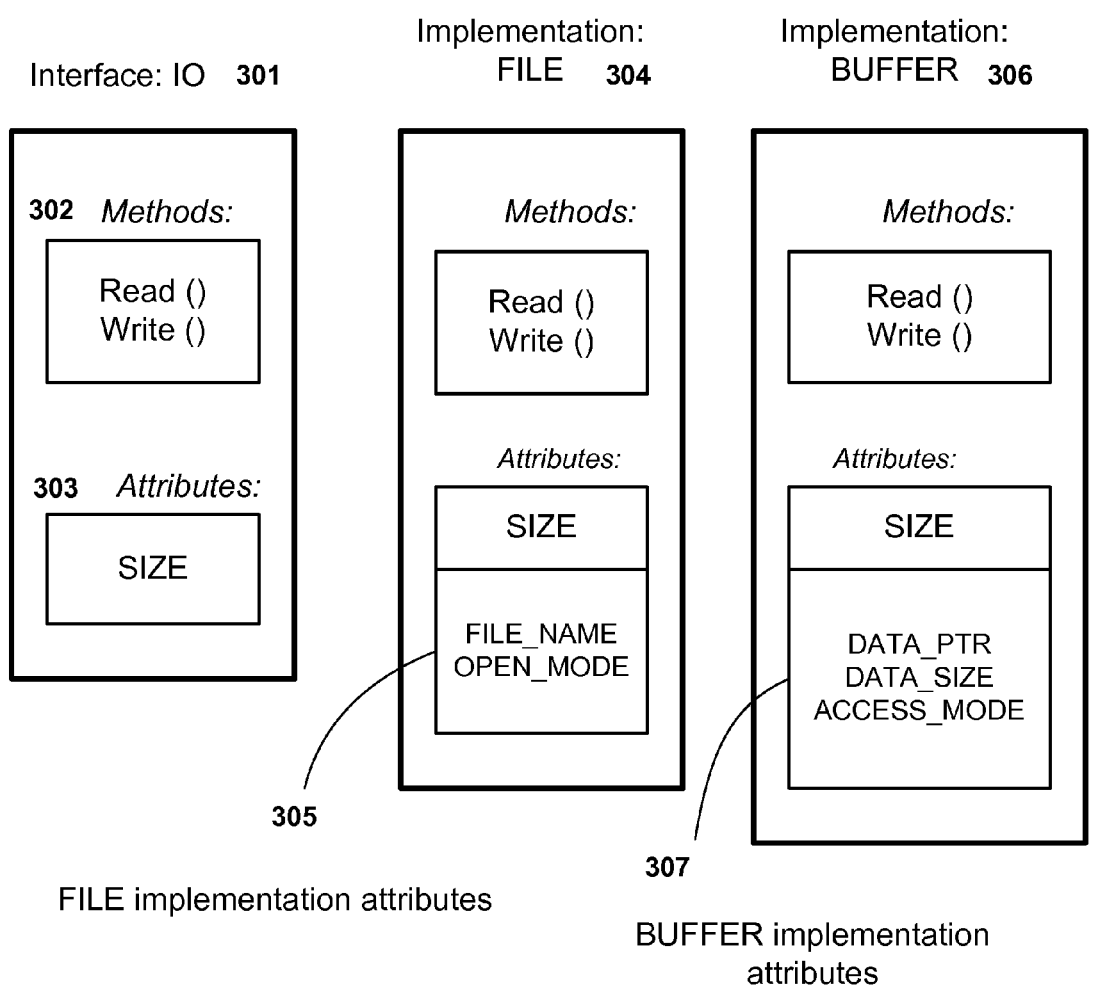
FIG. 3 illustrates properties of a base interface and properties of an implementation of an object, in accordance with an exemplary embodiment.

The implementation and interface properties discussed in the above examples are shown in FIG. 3. The base IO interface 301 contains methods 302 Read and Write. Both implementations 304 FILE and 306 BUFFER support methods and properties of the base IO interface 301. They also add to the properties of the IO interface 301 their own implementation properties 305 and 307, respectively.

The implementation 304 FILE properties 305 are FILE NAME (name of a file in a file system) and OPEN_MODE (a set of flags determining the desired access to the file data, for example, whether write access is required, or whether the file must be created if it does not yet exist in the file system). The implementation 306 BUFFER properties 307 are DATA PTR (pointer to an external data buffer), DATA_SIZE (size of the externally provided data buffer) and ACCESS_MODE (a set of flags for controlling access to the contents of the buffer, e.g., whether write access is allowed, or whether the data must be copied to an internal buffer before use).

In the preferred embodiment, besides the interface properties and implementation properties, each object can have a set of custom properties. In contrast to interface properties, the set of custom properties is not specified during object development. The custom properties can be added to an object in an arbitrary manner by other objects during system deployment. Reading and writing the values of the custom properties can be performed using the same methods as for the interface and the implementation properties. In the preferred embodiment, ranges of identifiers of the properties of each type are different and a possibility of collision of properties of different types is eliminated.

Figure 4:
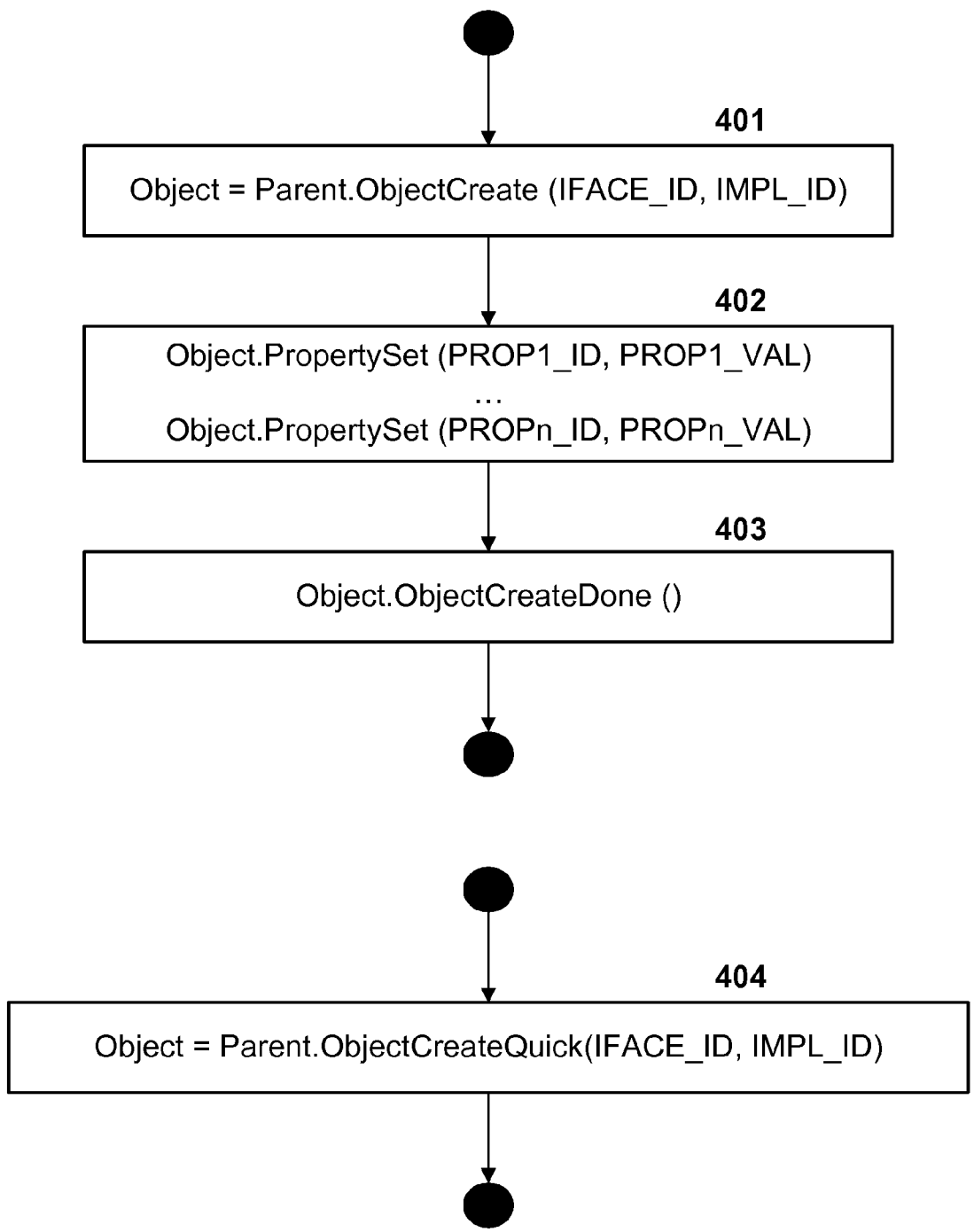
FIG. 4 illustrates a flow chart for creation of instances of an object, in accordance with an exemplary embodiment.

In the programmable system, according to the preferred embodiment, creation of object instances can be performed in two phases, as illustrated in FIG. 4. In the first phase, in step 401, a partially initialized object structure is created by invocation of a method ObjectCreate of a parent object. The arguments that are passed with the method are an identifier of the interface and (optionally) an identifier of the implementation. Then, in step 402, the properties needed for correct object initialization are set. Note that these can be interface properties and/or implementation properties. At this stage object methods cannot be invoked as the object is not yet fully initialized.

At the second phase, in step 403, the method for final object creation ObjectCreateDone is invoked. After this method is correctly executed, the object is fully constructed and is ready for use. In case of incorrect values of the initialization properties or other errors, the method for final object creation can return an error code and object creation is considered as failed.

Alternatively, the process of object creation can be optimized by combining both of the above phases in cases when object creation does not require setting of the initialization properties or if the values of these properties are considered to be correct by default. A single-stage object creation is implemented by the method 404 ObjectCreateQuick. The object creation process returns a descriptor (i.e., object handle) that is used for invocation of the methods of the system and the application interfaces. These methods can include reading and writing the properties' values, creation and termination of objects and sending messages.

In the implementation of the programmable system of the preferred embodiment, all the created objects form a hierarchy. One of the objects serves as a root of the hierarchy. It exists throughout the life-time of the system. Other objects are always created as the child-objects of other objects (including the root object). In such a hierarchical system implementation methods used for object creation are the methods of a standard system interface of an object. Thus, each object has the methods for creation its own child-objects. An object termination is implemented by a method of a system interface of an object—ObjectClose.

In the proposed system implementation the system hierarchy can be used for controlling the life span of created objects. When an object is destroyed, all of its child-objects are automatically destroyed as well. Thus, the system implements an automatic method for freeing up the unused system resources. When each object is being destroyed, the system invokes its internal method OnObjectClose. The implementation of this method can free up additional system resources, memory, etc.

In the preferred embodiment, the object hierarchy is also used for controlling an aggregated volume of the resources (such as, for example, aggregated memory), consumed during processing specific request. For example, an anti-virus application can monitor the amount of resources allocated for processing of a certain file. In the case of archives, the anti-virus processing of the file requires unpacking of archive contents and recursive processing of files stored in the archive. In the programmable system described herein, the set of objects instantiated during archive processing can form an object hierarchy. In such a hierarchy, the archive file serves as a root object and the archive contents as child objects on different levels. Then, the system can monitor the total amount of resources allocated for processing archive object with all of its sub-objects (for example, total amount of memory).

A structure of an exemplary standard system interface implemented for each object is shown in FIG. 5. The methods of the standard system interface are divided into the following categories:

(1) Methods for creation and destruction of the objects 501. These methods include:

ObjectCreate (INTERFACE_ID, IMPLEMENTATION_ID):HANDLE

This method creates an object structure. The system finds a module that contains an instance of an object implementation that satisfies certain criteria. The identifier of a requested interface has to be specified. Optionally, the identifier of the module where the interface is implemented can be specified. If an arbitrary interface implementation is allowed, than the IMPLEMENTATION_ID value can be set as IMPLEMENTATION_DEFAULT. This value means that the system will provide a default implementation of a given interface.

A created object becomes a child-object of the object where the method ObjectCreate was invoked.

Object creation is completed by method ObjectCreateDone. This method completes object creation after the values of required properties have been set by a method PropertySet.

A single-phase object creation method ObjectCreateQuick (INTERFACE_ID, IMPLEMENTATION_ID):HANDLE invokes ObjectCreate and ObjectCreateDone methods. Object destruction can be performed by ObjectClose (HANDLE) method. An implementation of this method results in destruction of all of the child-objects within the hierarchy.

(2) The methods for navigation through the hierarchy 502. A method ParentGet (HANDLE) returns a descriptor of a parent-object. A method ChildGetFirst (CHILD_ENUM_DATA):HANDLE returns a descriptor of a first child-object and initializes a structure CHILD_ENUM_DATA that is passed into a method ChildGetNext.

A method ChildGetNext (CHILD_ENUM_DATA):HANDLE returns a descriptor of a next child-object and modifies the structure CHILD_ENUM_DATA, so that the next invocation of the method ChildGetNext returns the next child object.

(3) Object property management methods 503.

A method ProperyIsPresent (PROPID):BOOL. This method returns a Boolean value TRUE if the value of the property with identifier PROPID is set on a given object, and returns FALSE otherwise.

A method PropertyGet (PROPID):VALUE. This method returns a value of a property with the identifier PROPID. The VALUE represents data object that can accept various data types (i.e. data type VARIANT in COM model). The value of a property can be received by invoking a method of an internal object interface OnProperyGet.

A method PropertySet (PROPID, VALUE) sets a value of a property with identifier PROPID. If the property with this identifier does not exist and the property is a custom property, it is created. For setting a value of a property a method of an internal object interface OnProperySet is invoked.

A method PropertyDelete (PROPID) removes the property with the identifier PROPID from the set of custom properties of an object.

A method PropertyNext (PROPID):PROPID facilitates listing of the identifiers of the properties set on the object. In order to receive a first identifier a special value PROPID_FIRST is passed through the method. For receiving the value of each subsequent identifier the value of the previous identifier needs to be passed through this method.

(4) Methods for managing memory 504.

A method SetObjectHeap (HEAPOBJ) facilitates binding of an object with object's memory pool. If an object is bound to its own memory pool, then memory allocation performed by this object and its child-objects is implemented through this memory pool. Thus, an aggregated memory volume allocated for processing an individual request can be controlled. Note that during processing of the request a hierarchy of objects-processors is created.

A method HeapAlloc (SIZE):PTR facilitates memory allocation using memory pool bound to an object. If a given object does not have its own memory pool, than a request is re-addressed to a nearest parent-object that is bound to a memory pool, or if such an object does not exist, the request is passed on to the root object.

A method HeapRealloc (PTR, SIZE):PTR facilitates size changes of a previously allocated memory block. An additional memory is allocated from the same pool from which the memory was allocated for the previous block (see method HeapAlloc).

A method HeapFree (PTR) frees up a block of memory that was allocated earlier by HeapAlloc or by HeapRealloc methods.

(5) Message sending/receiving methods 505.

A method SendMsg (MSG_CLASS, MSG_ID, MSG_DATA):STATUS. This method facilitates sending a message to a parent-object. The message is passed upwards through the hierarchy of parent-objects until it reaches a root node of the hierarchy or until it is stopped by one of the processing objects.

A method BroadcastMsg (INTERFACE_ID, MSG_CLASS, MSG_ID, MSG_DATA):STATUS. This method facilitates sending messages to child-objects. Each child-object automatically sends messages to its respective child-objects. The messages are sent only to the objects with interface identifier INTERFACE_ID. If the INTERFACE_ID has the value INTERFACE_ANY, the messages are sent to all of the objects.

A method RegisterMsgHandler (MSG_CLASS, MODE, RECV_OBJECT) facilitates object's subscription for receiving messages that go through a particular object. The object, referenced by RECV_OBJECT, is registered to receive messages, passed through the target object. When a message is passed through the target object, the system checks, whether there are receiver objects registered on the target object for messages with class equal to MSG_CLASS. For each such receiver object, the system calls its internal method OnMsgReceive, passing the message with its associated message data.

A method UnregisterMsgHandler (MSG_CLASS, RECV_OBJECT) terminates object's subscription for receiving messages that was set by invoking the method RegisterMsgHandler.

A structure of an internal interface of an object, according to the preferred embodiment, is illustrated in FIG. 6. The internal interface of an object includes the following methods:

(1) Object creation support methods 601.

A method OnObjectInit ( ):STATUS. The system invokes this method at the first phase of an object creation (i.e. in the process of execution of ObjectCreate method). Implementation of this method can include procedures for initialization of the internal structures of the given objects.

A method OnObjectInitDone ( ):STATUS. The system invokes this method at the second phase of the object creation (i.e. in the process of execution of ObjectCreateDone method). Implementation of this method can perform operations for final preparation of the object using property values set between invocations of ObjectCreate and ObjectCreateDone methods.

(2) Method supporting object destruction 602.

A method OnObjectClose ( ):STATUS. The system invokes this method in the process of removal of objects. An object removal can be initiated by a direct call of a method ObjectClose or it can be implemented automatically as a result of an automatic removal of a parent-object. Implementation of this method performs operations connected to cleaning internal data structures connected to a given object.

(3) Message handling support methods 603.

A method OnMsgReceive (MSG_CLASS, MSG_ID, HDL_SENDER, MSG_DATA): STATUS. This method is invoked by the system when an object receives a message. An object can receive a message if it goes through the object according to the message handling rules or if the object is registered as a recipient of messages addressed to another object. The return value of this method (STATUS) is used by the system to control message propagation. One special kind of return value is STATUS_MSG_DONE, telling the system to stop further propagation of the message to other objects.

In object-oriented infrastructures message handling is implemented in an indirect (i.e. metaphorical) manner. Sending messages is a method of inter-object communications. Note that an object that sends a message is not aware of what objects receive and process this message, unlike a conventional communication based on direct method calls. Sending messages using metaphorical approach is advantageous because the connection between the source-objects and message processing-objects is less rigid. The more flexible inter-object connection simplifies development of complex systems. In different object-oriented infrastructures many schemas of message handling are employed. For example, in a COM architecture the interface IConnectionPoint is used.

This interface can be supported by any COM object. However, implementation of such an interface has to be written by a developer of each individual component, because the COM infrastructure does not provide necessary ready-to-use primitives for message handling.

The system implementation, according to the preferred embodiment, offers a universal model for sending and receiving messages based on a hierarchical object structure. Each object supports a list of subscriber objects subscribing to messages of a particular class. The support of subscriber lists is facilitated by the system and a developer of application objects does not have to do it manually as in the case, for example, of COM architecture.

In the preferred embodiment, messages are allowed to be sent in both directions—up and down the hierarchy. If the message is sent up the hierarchy, it is sent to a parent object and then to a parent of this parent object and so on, until it gets to the root object. If the message is sent downwards in the hierarchy, it is sent to all child-objects, and then to child-objects of the child-objects and so on, all the way down. The objects located on different levels can process the message passing through them. It is also possible to associate an object with a target object. The associated object serves as a "receiver" that receives the messages that pass through the target object (it is done through a subscription registration).

According to the preferred embodiment, the messages are distinguished by a class of a message and an identifier of a message. Grouping messages by class provides for optimization of message handling, because an object can subscribe to receiving only messages of a particular class. When an object receives a message, the system invokes a method of an internal interface OnMsgReceive in this object. When processing a message, an object can stop propagation of this message further, returning special status value STATUS_MSG_DONE (message processing is considered complete in this case).

A message handling schema, according the preferred embodiment, has a number of advantages. In particular:

(1) a mechanism for controlling reception of messages is synchronized with a mechanism for controlling a life span of the objects, thus eliminating a possibility of sending a message to an already destroyed object;

(2) rules for propagation of message in both directions—up and down are enforced;

(3) an ability to stop message propagation on objects of different levels.

Modular development of programmable applications is implemented in the proposed system by a special component model that uses a separate module (file), containing implementation of one or several programmable object interfaces as a component. The module includes code, which ensures the functionality of the methods supported by the interface, as well as metadata describing which interface implementations are supported by this module.

During system initialization, the contents of one or several folders (according to a particular configuration) is scanned. The metadata is read from all of the components located in the folders. The metadata contains information regarding which interfaces are implemented by a particular module (i.e., a list of interface identifiers and a list of implementations). Using this information the kernel of the system builds a service table. The service table determines which module needs to be loaded for instantiating an object having a particular interface identifier (and an implementation identifier if it is set).

Figure 7:
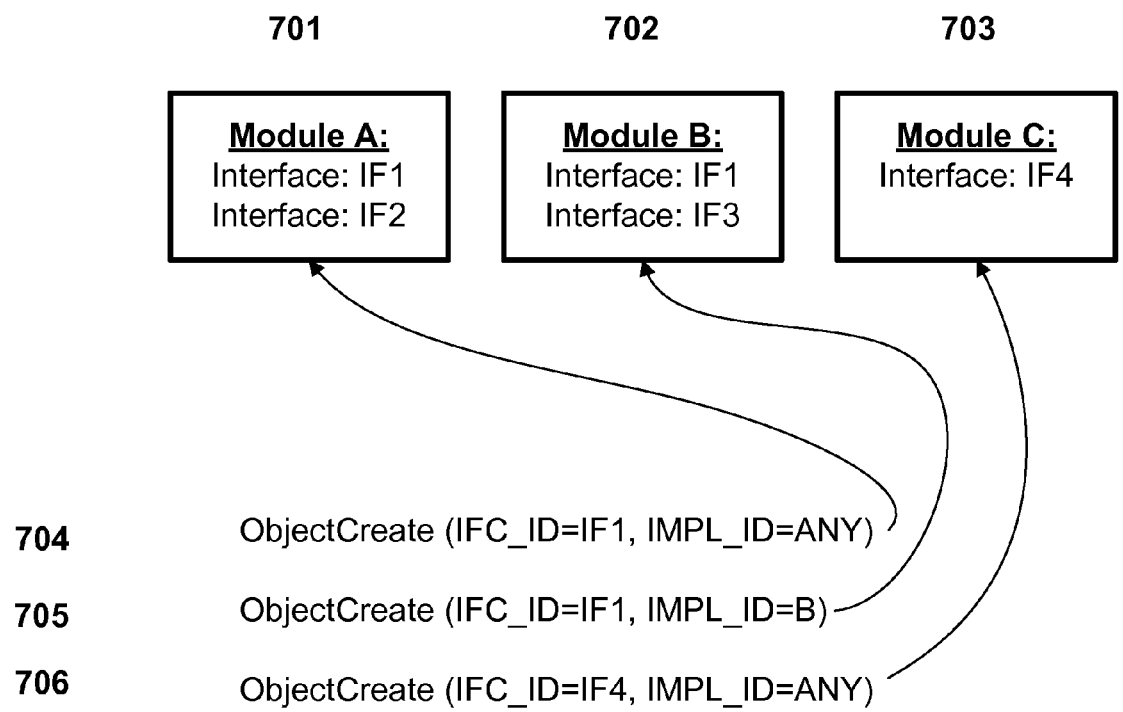
FIG. 7 illustrates how components are loaded, in accordance with an exemplary embodiment.

FIG. 7 illustrates a process of loading the components for instantiation of objects based on different combinations of the interface identifiers and the implementation identifiers. The components 701, 702 and 703 contain implementations of different interfaces. The component 701 implements objects supporting interfaces IF1 and IF2, the component 702 objects supporting interfaces IF1 and IF3, and the component 703 objects supporting interface IF4. Upon request 704 for instantiating an object implementing interface IF1 (the implementation identifier is not set), the system loads a component, containing an implementation of a given interface marked as a default implementation. In this example it is component module A.

Upon request 705 for instantiating an object implementing interface IF1 with a set implementation identifier B, the system loads module B (because it was explicitly requested as an implementation identifier).

Upon request 706 the system loads module C, because it is the only module containing implementation of objects with interface IF4.

In one embodiment, the proposed object-oriented programmable system can be used for development of anti-virus applications. One of the specific problems in developing anti-virus applications is a necessity for frequent updates of the code that detects virus threads and other potentially destructive files. The frequently updated code needs to be tested on different platforms such as, for example, Microsoft Windows, Linux, Solaris, FreeBSD, etc. The updates of anti-virus code can be very frequent, and how fast the new code is delivered to a user is critical. Therefore, all measures that can reduce testing time are highly desirable.

In the preferred embodiment, code updates and testing can be optimized by dividing the modules containing the anti-virus code into platform-independent and platform-dependent components. The platform-independent modules contain code that is isolated from the interfaces of the operating system. These modules can be loaded without code changes onto any operating system using the same type of CPU. These modules are implemented in a platform-neutral format and are loaded by a special loader as a part of an anti-virus application.

Platform-independent modules do not depend on an operating system and need to be tested only once for a given type of processor. Thus, the time of anti-virus updates is reduced and the anti-virus application becomes more reliable.

Figure 8:
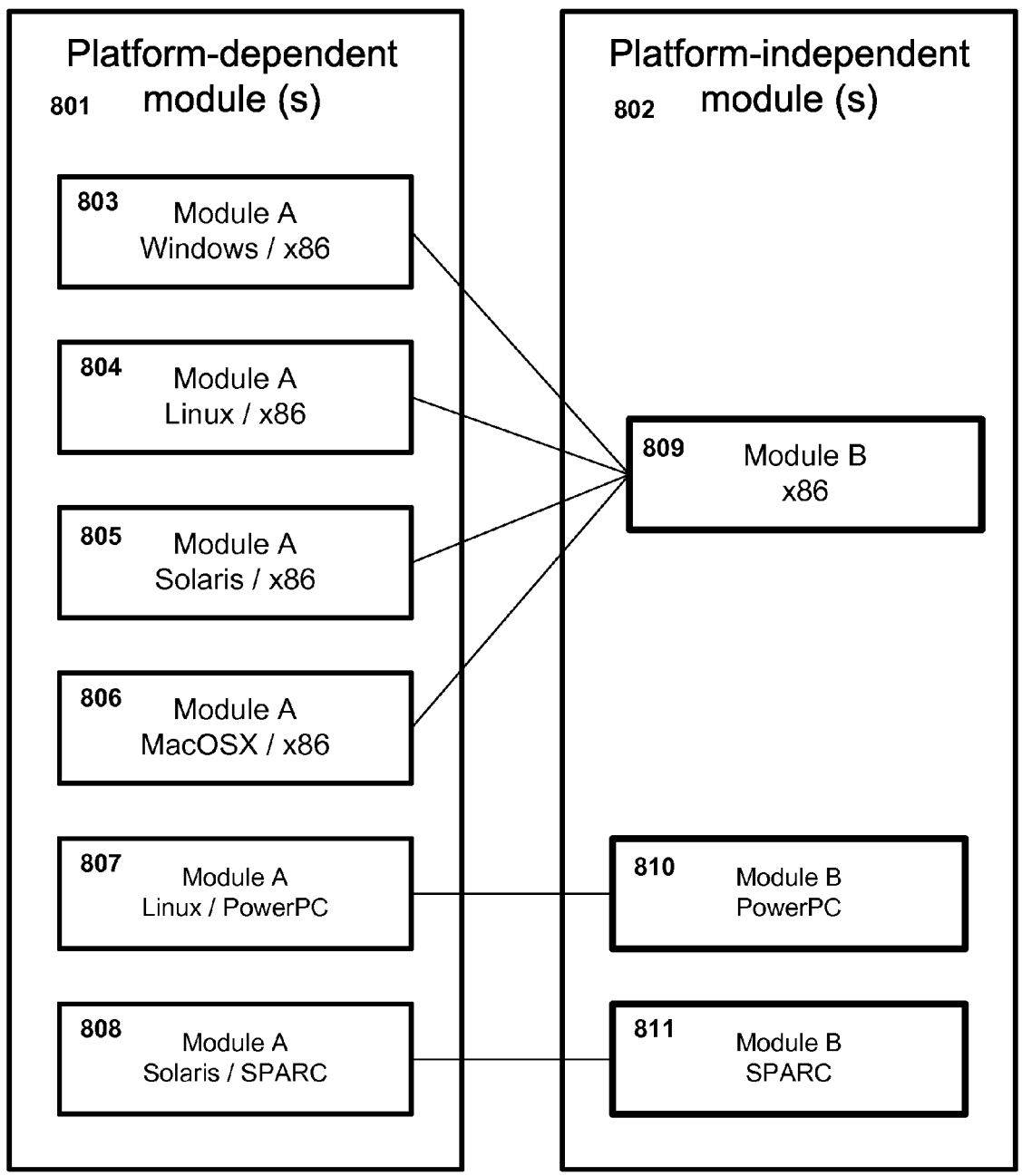
FIG. 8 illustrates system-dependent and system-independent modules, in accordance with an exemplary embodiment.

FIG. 8 illustrates a set of modules implemented for various target platforms. The set of modules includes platform-dependent modules 801 and platform-independent modules 802. The target platforms include Windows/x86, Linux/x86, Solaris/x86, MacOSX/x86, Linux/PowerPC, Solaris/SPARC. A set of components includes platform-dependent modules 803, 804, 805, 806, 807 and 808 for each of the respective platforms. The platform-independent components 809, 810, 811 are usually needed in smaller numbers. As shown in FIG. 8, the instance of module 809 for processor x86 can be used without any changes on various target platforms (such as Microsoft Windows, Linux, Solaris and Mac OS/X) also implemented on x86 processor.

Figure 9:
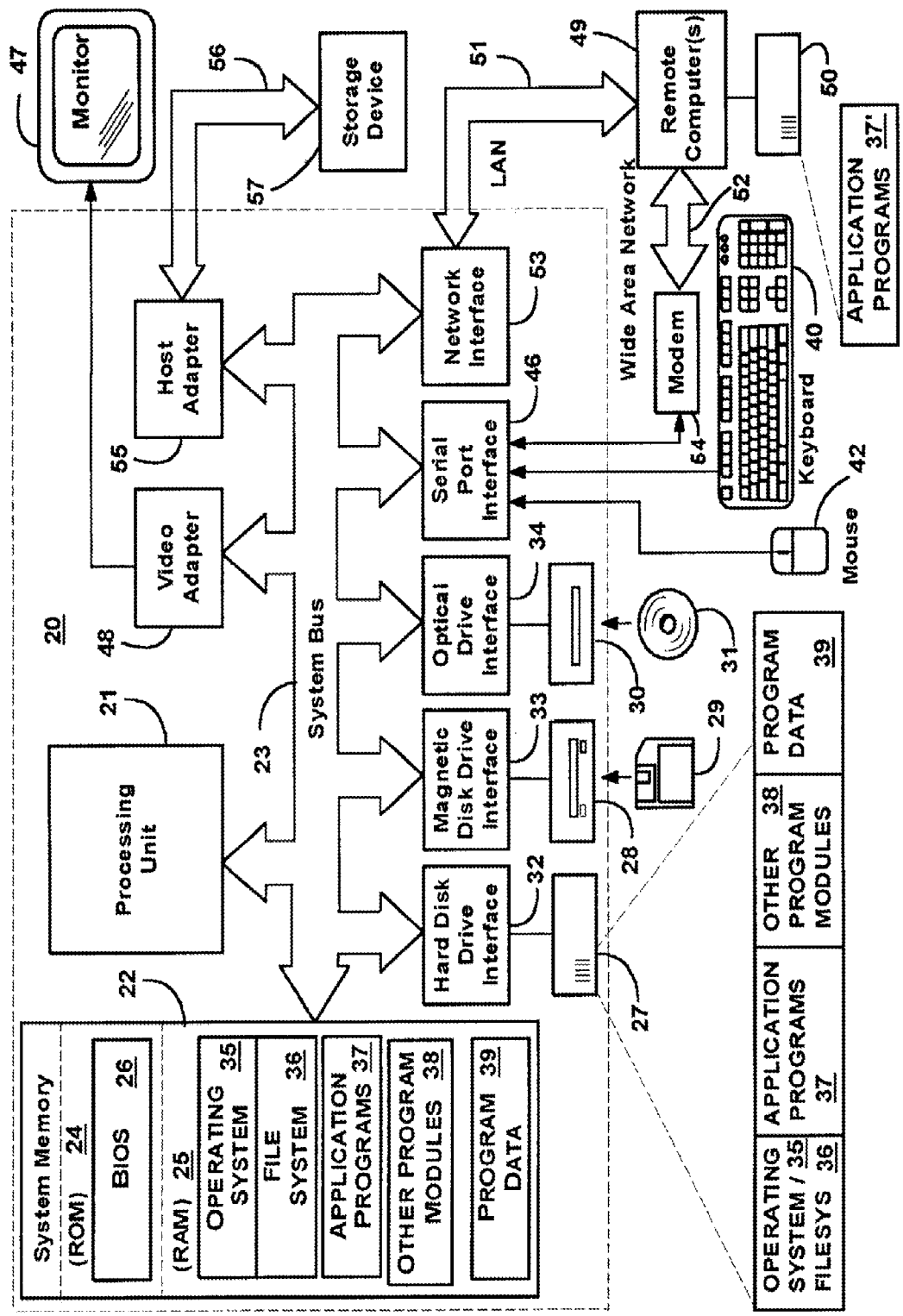
FIG. 9 illustrates an exemplary computer system on which the invention may be implemented.

With reference to FIG. 9, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24. The personal computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers be used. Such computers as described above can be used in conventional networks, e.g., the Internet, local area networks, regional networks, wide area networks, and so forth. These networks can link various resources, such as user computers, servers, Internet service providers, telephones connected to the network, and so on.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A system for processing objects within an object-oriented infrastructure, the system comprising:
   a processor;
   a memory coupled to the processor;
   a plurality of objects stored in the memory and organized into a hierarchy; and
   a set of properties stored within each object;
   wherein:
      each object includes an application interface comprising a set of methods and a set of properties,
      each object broadcasts the messages through the hierarchy in a downward direction and sends the messages in an upward direction, and without specifying receiver objects for the messages,
      each object registers a subscription for messages, and
      each object includes a system interface, comprising a set of system-defined methods and properties that are common to all objects in the system,
      wherein the system interface of each object comprises methods for creation of child objects and methods for removal of the objects and their child objects,
   wherein the system dynamically loads loadable component modules, wherein executable code of at least some objects is located in dynamically loadable component modules,
   wherein the at least one dynamically loadable component module is independent of operating system and is useable with different operating systems without recompilation, and
   wherein the system also includes at least one operating system-dependent component module, with any objects based on system-dependent module and any objects based on system-independent modules being part of the same hierarchy.

2. The system of claim 1, wherein an implementation of each object includes internal methods for notifying the object of events occurring in the system, the internal methods being called by the system upon creation and removal of instances of this object.

3. The system of claim 1, wherein the processing includes anti-malware processing of an object.

4. The system of claim 1, wherein the method for creation of each child object comprises:
   (i) creating a structure of the child-object;
   (ii) following (i) setting initialization properties of the child-object based on an external source of initialization data; and
   (iii) following (ii) completing creation of the child-object, using values of the initialization properties, wherein the system does not permit calls to any method of the child-object until after step (iii) is completed.

5. The system of claim 1, wherein the method for removal of the objects comprises an automatic removal of all child-objects within the hierarchy and freeing up system resources allocated for removed objects.

6. The system of claim 3, wherein the anti-malware processing includes anti-virus detection in an object and updating of anti-virus databases.

7. A system for processing objects within an object-oriented infrastructure, the system comprising:
   a processor;
   a memory coupled to the processor;
   a plurality of objects stored in the memory and organized into a hierarchy; and
   a set of properties stored within each object;
   wherein:
      each object includes an application interface comprising a set of methods and a set of properties,
      each object broadcasts the messages through the hierarchy in a downward direction and sends the messages in an upward direction, and without specifying receiver objects for the messages,
      each object registers a subscription for messages, and
      each object includes a system interface, comprising a set of system-defined methods and properties that are common to all objects in the system,
      wherein the system interface of each object comprises methods for creation of child objects and methods for removal of the objects and their child objects,
   wherein the system dynamically loads loadable component modules,
   wherein executable code of at least some objects is located in dynamically loadable component modules,
   wherein the at least one dynamically loadable component module includes metadata that specifies types of objects included within that particular component module, and the system includes a loader that uses the metadata to find and load a module with the implementation of an object of the required type.

8. The system of claim 1, wherein the objects sending the messages and the objects receiving the messages are organized into the same hierarchy having a single root object.

9. The system of claim 1, wherein a set of properties and a set of methods of object implementation for at least some objects extends the set of properties and the set of methods of object base interface.

10. The system of claim 1, wherein the messages sent by each object in the upwards direction are propagated from a child-object to a parent-object until the messages reach a root of the object hierarchy.

11. The system of claim 1, wherein the messages are defined by a class and by an identifier of each message within the class.

12. The system of claim 11, wherein each object is registered for receiving the messages of the specified class.

13. A method for processing objects within an object-oriented infrastructure, the method comprising:
   organizing a plurality of objects into a hierarchy;
   providing a set of properties for each object; and
   implementing functionality for sending and receiving messages between objects, and
   implementing functionality for anti-malware processing of objects that includes unpacking of structured objects, checking the unpacked objects for malware signatures, and updating of malware databases,
   wherein:
      each object includes an application interface comprising a set of methods and a set of properties,
      each object broadcasts the messages through the hierarchy in a downward direction and sends the messages in an upward direction, without specifying receiver objects for the messages,
      each object registers a subscription for messages, and
      each object includes a system interface, comprising a set of system-defined methods and properties that are common to all objects in the system,
      wherein the system interface of each object comprises methods for creation of child-objects and methods for removal of the objects and their child-objects.

14. The method of claim 13, wherein an implementation of each object includes internal methods for notifying the object of events occurring in the system, the internal methods being called by the system upon creation and destruction of instances of this object.

15. The method of claim 13, wherein the method for creation of each child-object comprises:
   (i) creating a pre-initialized structure of the child-object;
   (ii) following (i) setting initialization properties of the child-object based on an external source of initialization data; and
   (iii) following (ii) completing object creation for the child-object, using values of initialization properties,
   wherein the system does not permit calls to any methods of the child-object until after step (iii) is completed.

16. The method of claim 13, wherein the method for removal of the objects comprises an automatic removal of all child-objects within the object hierarchy and freeing up system resources allocated for removed objects.

* * * * *

UNITED STATES PATENT AND TRADEMARK OFFICE
CERTIFICATE OF CORRECTION

| | |
|---|---|
| PATENT NO. | : 7,418,710 B1 |
| APPLICATION NO. | : 11/868292 |
| DATED | : August 26, 2008 |
| INVENTOR(S) | : Kaspersky et al. |

It is certified that error appears in the above-identified patent and that said Letters Patent is hereby corrected as shown below:

On the title page item [75] in the listing of inventors' names, please replace "Andrey P. Doukhvalov" with --Andrey V. Doukhvalov--.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,418,710 B1
APPLICATION NO. : 11/868292
DATED : August 26, 2008
INVENTOR(S) : Kaspersky et al.

Page 1 of 1

It is certified that error appears in the above-identified patent and that said Letters Patent is hereby corrected as shown below:

On the title page, item [75]: Inventors, replace "Andrey V. Doukhvalov" with --Andrey P. Doukhvalov--.

Signed and Sealed this

Twenty-seventh Day of October, 2009

David J. Kappos
*Director of the United States Patent and Trademark Office*